(12) United States Patent
Axmon et al.

(10) Patent No.: US 9,071,980 B2
(45) Date of Patent: Jun. 30, 2015

(54) METHOD AND APPARATUS FOR SIGNAL QUALITY DETERMINATION IN A COMMUNICATION NETWORK

(75) Inventors: Joakim Axmon, Kävlinge (SE); Muhammad Kazmi, Bromma (SE); Bengt Lindoff, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 176 days.

(21) Appl. No.: 13/522,807

(22) PCT Filed: May 22, 2012

(86) PCT No.: PCT/SE2012/050552
§ 371 (c)(1),
(2), (4) Date: Jul. 18, 2012

(87) PCT Pub. No.: WO2013/048302
PCT Pub. Date: Apr. 4, 2013

(65) Prior Publication Data
US 2013/0077508 A1    Mar. 28, 2013

Related U.S. Application Data

(60) Provisional application No. 61/539,747, filed on Sep. 27, 2011.

(51) Int. Cl.
| | |
|---|---|
| *H04W 4/00* | (2009.01) |
| *H04W 24/00* | (2009.01) |
| *H04W 48/16* | (2009.01) |
| *H04W 16/14* | (2009.01) |
| *H04W 36/00* | (2009.01) |

(52) U.S. Cl.
CPC .............. *H04W 24/00* (2013.01); *H04W 16/14* (2013.01); *H04W 36/0094* (2013.01); *H04W 48/16* (2013.01)

(58) Field of Classification Search
None
See application file for complete search history.

(56) References Cited

U.S. PATENT DOCUMENTS

2011/0051695 A1    3/2011    Dinan

FOREIGN PATENT DOCUMENTS

| EP | 1865736 A1 | 12/2007 |
| WO | 2010016680 A2 | 2/2010 |

OTHER PUBLICATIONS

NTT DOCOMO, "Issues on narrow measurement bandwidth," TSG-RAN Working Group 4 Meeting #60, R4-114243, Athens, Greece, Aug. 26, 2011.

*Primary Examiner* — Kwang B Yao
*Assistant Examiner* — Adam Duda
(74) *Attorney, Agent, or Firm* — Murphy, Bilak & Homiller, PLLC

(57) ABSTRACT

One aspect of the present invention is method for signal quality measurement that provides significant improvements in accuracy, at least in certain scenarios where conventional approaches to such measurements are vulnerable to inaccuracies. Non-limiting example scenarios include instances where a communication network uses downlink carriers in neighboring cells with overlapping frequencies but with different bandwidths and/or center frequencies. In such cases, there may be uneven interference across the carrier bandwidth, e.g., arising from neighboring carriers operating at different center frequencies and/or at different bandwidths. Thus, making the signal quality measurement for a given carrier depend on a combination of measurements taken at different frequency regions of the carrier provides a clearer, more accurate picture of the interference or loading conditions bearing on that carrier.

30 Claims, 9 Drawing Sheets

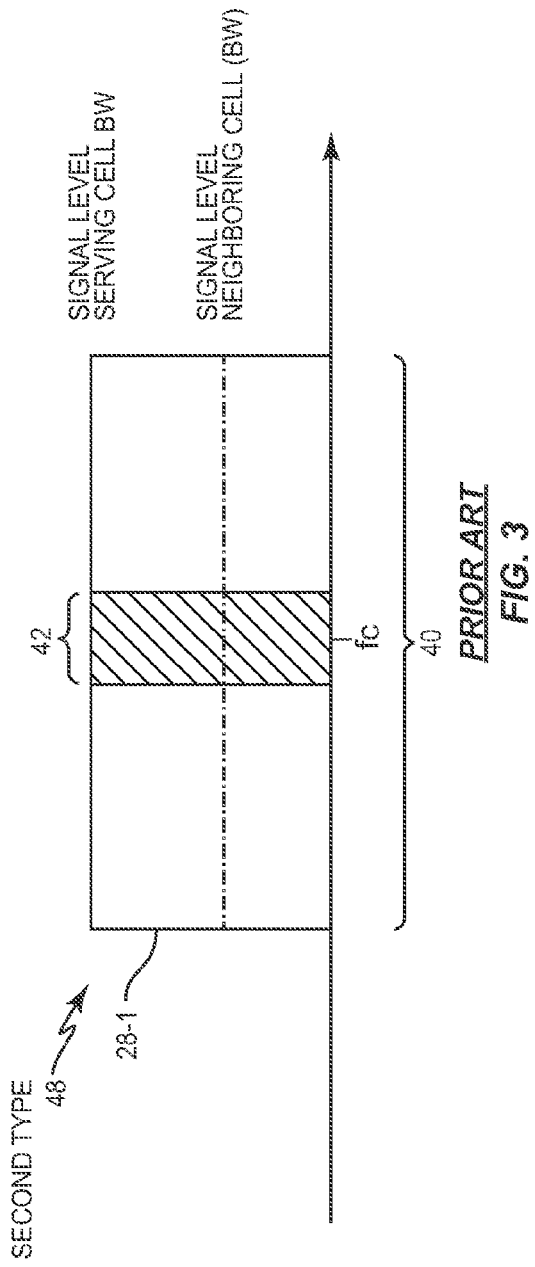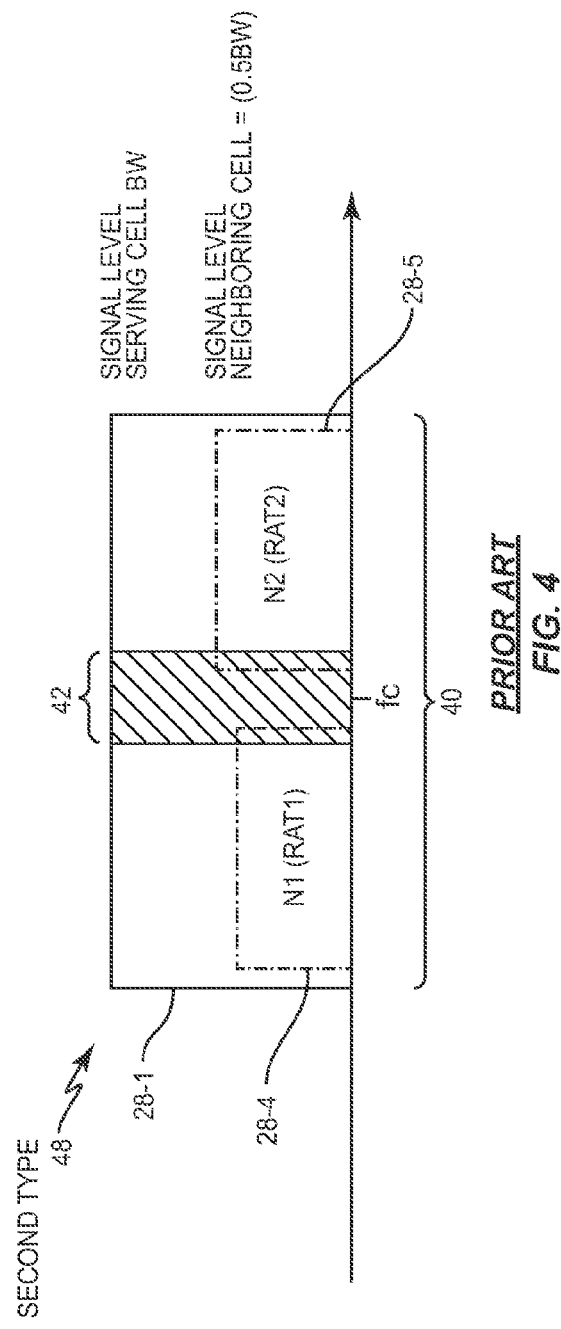

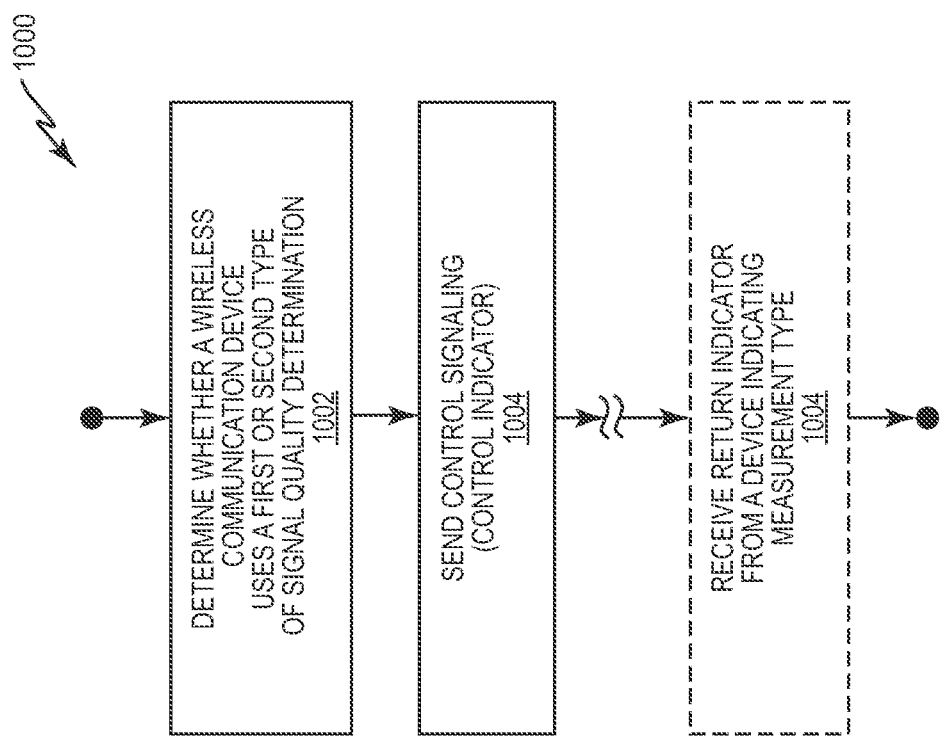

METHOD AND APPARATUS FOR SIGNAL QUALITY DETERMINATION IN A COMMUNICATION NETWORK

FIELD OF THE INVENTION

The present invention generally relates to communication networks, and particularly relates to signal quality determination in such networks.

BACKGROUND

Signal measurements of serving and neighboring cells are important for optimized mobility. The LTE standard supports variable bandwidth (BW)—from 1.4 MHz to 20 MHz—but mobility performance must be the same regardless of system BW. It is known for a communication network to signal one common measurement bandwidth, for use by a User Equipment (UE) in performing certain mobility measurements (e.g. Received Signal Received Power, "RSRP", and/or Received Signal Received Quality, "RSRQ", measurements) in Radio Resource Control (RRC) IDLE and CONNECTED states.

Thus, in an example where different cells on the same carrier frequency operate over 5 MHz and 10 MHz bandwidths, for example, then the network can request that the UE measure over 5 MHz (i.e., a common measurement BW for all cells). However in early releases of the LTE standard, the minimum mobility measurement requirements (i.e., the RSRP/RSRQ accuracy) are to be met by a UE measuring signal quality of a downlink carrier from a cell in the network on six or more of the Resource Blocks (RBs) at the center of the downlink carrier bandwidth. This approach allows the same minimum mobility measurement performance regardless of whether the downlink carrier bandwidth is 1.4 MHz or 20 MHz.

Now, it may be that all cells on the same downlink carrier frequency are configured with the same bandwidth of, say, 10 MHz. In such a scenario, reasonable signal quality estimation may be obtained by the UE measuring signal quality on the six central RBs of each downlink carrier of interest, because the load is typically evenly spread over the full bandwidth of the downlink carrier. However there are advanced deployment network deployment scenarios where such signal quality approaches may not work well.

For example, in cases where a network operator is migrating from one radio access technology to another (say, WCDMA to LTE) the migration will typically be carried out gradually. Thus, it may be that one or more areas in the network will use large bandwidth cells, e.g., LTE carrier bandwidths of 10 MHz, while neighbouring cells overlapping the large-bandwidth cells will use smaller-bandwidth carriers, e.g., 5 MHz LTE carriers, and/or 5 MHz WCDMA carriers.

In another example, the network operator may be licensed for a 10 MHz bandwidth and may use that full bandwidth in a cell associated with a hotspot where network usage is high, e.g., an urban area with many potential simultaneous users. However, other cells in the same network may use only half of the bandwidth. Such reduced-bandwidth cells may overlap the hotspot cell or cells, but not each other, in order to reduce interference, and hence allow for lower transmission power (or alternatively, for wider coverage). Such a configuration may also be combined with carrier aggregation at (rural) hot spot areas. There also may be two network operators having licenses for say 5 MHz each, and at particular hotspot areas they combine their bandwidths to offer coverage in one or more 10 MHz cells.

In yet another scenario, an operator may have a license for a particular bandwidth, say 10 MHz, but uses a variable bandwidth in dependence on load conditions in order to save power (e.g., "green base stations"). During times with high traffic volumes, cells operate with the full bandwidth, but at times with low volumes, the cells are re-configured and re-arranged to have smaller bandwidths and to be distributed within the band such that some neighbor cells are on different carriers (reduction of interference). Cells with high load— e.g., in particular hotspot areas—may still have the full bandwidth.

In yet another scenario an operator may operate cells in heterogeneous network using some mix of full-bandwidth cells (e.g., 10 MHz) and partial-bandwidth cells. For example, in a two-tier heterogeneous network deployment scenario that includes high power nodes and low power nodes (e.g., a mix of macro-pico cells, macro-femto cells, macro-CSG cells, etc.), the high power nodes and lower power nodes may operate over 5 MHz and 10 MHz bandwidths, respectively. In an example network, a number of macro base stations provide corresponding macro cells, and a number of pico or femto base stations provide corresponding pico cells among or overlaid with one or more of the macro cells.

Yet another scenario involves coordinated multi-point transmission and reception (CoMP operation), which is also known as a multi-point communication system. With CoMP, a transmission originates at different locations—e.g. from non co-located BSs or from a combination of BSs and Remote Radio Heads (RRHs) and/or Remote Radio Units (RRUs). Other well-known examples of multi-point communication are DAS, RRH, RRU, etc. In such scenarios, the UE operates over more than one radio links—i.e., it receives from and/or transmits towards different locations. The network may use different bandwidths over different radio links. CoMP also may be used in conjunction with carrier aggregation.

In yet another scenario, all cells on a given downlink carrier frequency may have the same bandwidth (e.g. 10 MHz). However, the network may schedule downlink data to the UE from different cells in an orthogonal manner. For example in neighboring cells 1, 2 and 3, the network may schedule RBs over lower, central and upper parts of the bandwidth. However, the assigned resources also may change over time because of the lack of traffic or because of varying traffic situations in the involved cells.

Notably, signal quality measurements made on the downlink by a UE (e.g., RSRQ, RSSI or other measurements) are primarily used for mobility-related radio operation tasks, in both idle and connected states. In idle mode, the mobility-related radio operations include cell selection and cell reselection, including intra-frequency, inter-frequency and inter-RAT (e.g., between UTRA and LTE). In the connected state, mobility-related radio operations include cell change, handover, RRC connection re-establishment, RRC connection release with direction to a target cell, and primary component carrier, "PCC", change in carrier aggregation operation, or primary cell, "PCell", change in carrier aggregation.

RSRQ and other quality measurements are also used for radio operation tasks beyond those related to mobility, such as enhanced cell ID positioning, fingerprinting positioning, minimization of drive tests (MDT), network planning, configuration and tuning of radio network parameters, self organizing network (SON) operations, network monitoring, etc. Such radio operations involve, for example, the UE making and reporting signal quality determinations to the network, for one or more downlink carriers.

The mix of carrier bandwidths and/or center frequencies poses certain challenges with respect to accurate determination of signal quality by a UE. Signal quality determination may also be affected by the use of "spectrum margins", wherein the real bandwidth of downlink carriers is somewhat less than the nominal full bandwidth, to guard against spectral leakage at the bandwidth boundaries.

SUMMARY

One aspect of the present invention is a method for signal quality measurement that provides significant improvements in accuracy, at least in certain scenarios where conventional approaches to such measurements are vulnerable to inaccuracies. Non-limiting example scenarios include instances where a communication network uses different bandwidth downlink carriers and/or downlink carriers with different center frequencies. In such cases, there may be uneven interference across the carrier bandwidth, e.g., arising from neighboring carriers operating at different center frequencies and/or at different bandwidths. Thus, making the signal quality measurement for a given carrier depend on a combination of measurements taken at different frequency regions of the carrier provides a clearer, more accurate picture of the interference or loading conditions bearing on that carrier.

In an example embodiment, a method of operation in a wireless communication device configured for operation in a communication network comprises determining a signal quality of a downlink carrier of a cell in the communication network according to a first type of signal quality determination that includes obtaining multiple signal quality measurements from first and second frequency regions of the downlink carrier. For example, the two frequency regions are disjoint, with one positioned in the lower half of the overall carrier bandwidth and the other one positioned in the upper half of the overall carrier bandwidth.

For Orthogonal Frequency Division Multiplexing (OFDM), where the carrier of interest comprises a plurality of Resource Blocks (RBs) defined by the OFDM time-frequency grid, the first and second (and any additional) frequency regions may each comprise a range of contiguous RBs from a different portion of the overall OFDM bandwidth of the carrier. In any case, the example embodiment of the contemplated method includes determining the signal quality of the downlink carrier as a function of the multiple signal quality measurements, and performing at least one radio operation task using the determined signal quality. The radio operation task may be, for example, reporting the determined signal quality to the network, or otherwise using the determined signal quality for mobility and/or positioning operations. Regardless of the particular radio operation task(s) that take advantage of the improved signal quality determination, it will be noted that the determined signal quality is a final value based on the combination of the measurements taken from the two or more different frequency regions of the downlink carrier bandwidth from which signal quality measurements were obtained.

The above method, and variations of the above method, may be implemented in a wireless communication device, such as mobile terminal or other item of User Equipment (UE) configured for use in a communication network, such as a Third Generation Partnership Project (3GPP) cellular communication network. Non-limiting examples include cellular telephones, including smartphones, cellular network adaptors and modems, etc. In an example embodiment, a wireless communication device includes a transceiver configured to receive a downlink carrier of a cell in the communication network and further includes one or more processing circuits operatively associated with the transceiver. The one or more processing circuits are configured to determine a signal quality of a downlink carrier of a cell in the communication network according to a first type of signal quality determination, wherein the one or more processing circuits are configured to obtain multiple signal quality measurements from first and second frequency regions of the downlink carrier, and to determine the signal quality of the downlink carrier as a function of the multiple signal quality measurements. Further, the one or more processing circuits are configured to perform at least one radio operation task using the determined signal quality. As noted, the radio operation task(s) include, for example, performing positioning-related and/or mobility-related calculations, e.g., for handover, and/or reporting signal quality to the network for any variety of reasons.

While the above examples focus on obtaining measurements from first and second frequency regions, such language should be construed as requiring at least two frequency regions but allowing for the use of more than two frequency regions. For example, signal quality measurements may be obtained from one region around the center frequency and two or more other regions positioned in each of the upper and lower halves of the overall bandwidth. Further, one or more embodiments include determining signal quality for multiple carriers, e.g., where the device measures signal quality for a serving cell and one or more neighboring cells in the network. In such scenarios, multiple signal quality measurements may be obtained from respective multiple frequency regions of each downlink carrier for which signal quality is being determined, or for at least one of them. Indeed, for one or more of the carriers, or at different times, a wireless communication device as contemplated herein may use another technique for determining signal quality.

That is, the above-described first type of signal quality determination may be performed on a selective basis, where a device determines signal quality for one or more downlink carriers using the first type of signal quality determination, or using a different, second type of signal quality determination. As explained above, the first type of signal quality determination for a given downlink carrier is based on the device determining a final signal quality based on obtaining signal quality measurements from at least first and second frequency regions of the given downlink carrier. As a contrasting example, the second type of signal quality determination is based on signal quality measurements taken from only a single frequency region of the downlink carrier, e.g., around the center frequency.

The device may decide whether to use the first type of quality determination based on receiving a control indicator from the communication network. Additionally, or alternatively, the device may decide to use the first type of signal quality determination rather than the second type in cases where network configuration information determined or received by the device indicates that two or more cells in the network that are of interest with respect to signal quality determination by the wireless communication device have overlapping downlink carrier frequencies but have different bandwidths and/or different center frequencies. Additionally, or alternatively, the device selects the first type of signal quality determination in cases where measurement requirements information received or determined by the device indicate that the first type of signal quality determination is required or desired.

Correspondingly, in one or more embodiments, a network node configured for operation in a communication network includes one or more communication interfaces for sending an indicator to a wireless communication device. The indicator controls whether the device determines the signal quality for a downlink carrier of a cell in the communication network using the above-described first or second type of signal quality determination. The example node includes a control circuit that is configured to control the indicator, so that the first type of signal quality determination is indicated in the case that two or more cells in the network that are of interest with respect to signal quality determination by the wireless communication device have overlapping downlink carrier frequencies but have different bandwidths and/or different center frequencies. Additionally, or alternatively, the first type of signal quality determination is indicated by the network in cases where the measurement requirements are such that accuracy improvements gained through use of the first type of signal quality determination are needed or desired.

In a related embodiment, a method of controlling the type of signal quality determination used by a wireless communication device is implemented in a network node. The contemplated method includes sending an indicator to a wireless communication device, to control whether the wireless communication device determines a signal quality of a downlink carrier of a cell of the network using the first or second type of signal quality determination. As such, the method includes controlling the indicator to indicate that the first type of signal quality determination should be used in the case that two or more cells in the network that are of interest with respect to signal quality determination by the wireless communication device have overlapping downlink carrier frequencies but have different carrier bandwidths and/or different center frequencies. Additionally, or alternatively, the method includes indicating that the first type of signal quality determination should be used in the case that measurement requirement information indicates that the first type of signal quality determination is needed or desired.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 3 and 4 are diagrams of a known approach to signal quality determination using a single frequency regions, with the two diagrams showing different interference scenarios.

FIG. 10 is a logic flow diagram of an embodiment of a method of processing in a network node, for sending an indication to a wireless communication device regarding the type of signal quality determination to use.

DETAILED DESCRIPTION

Figure 1:
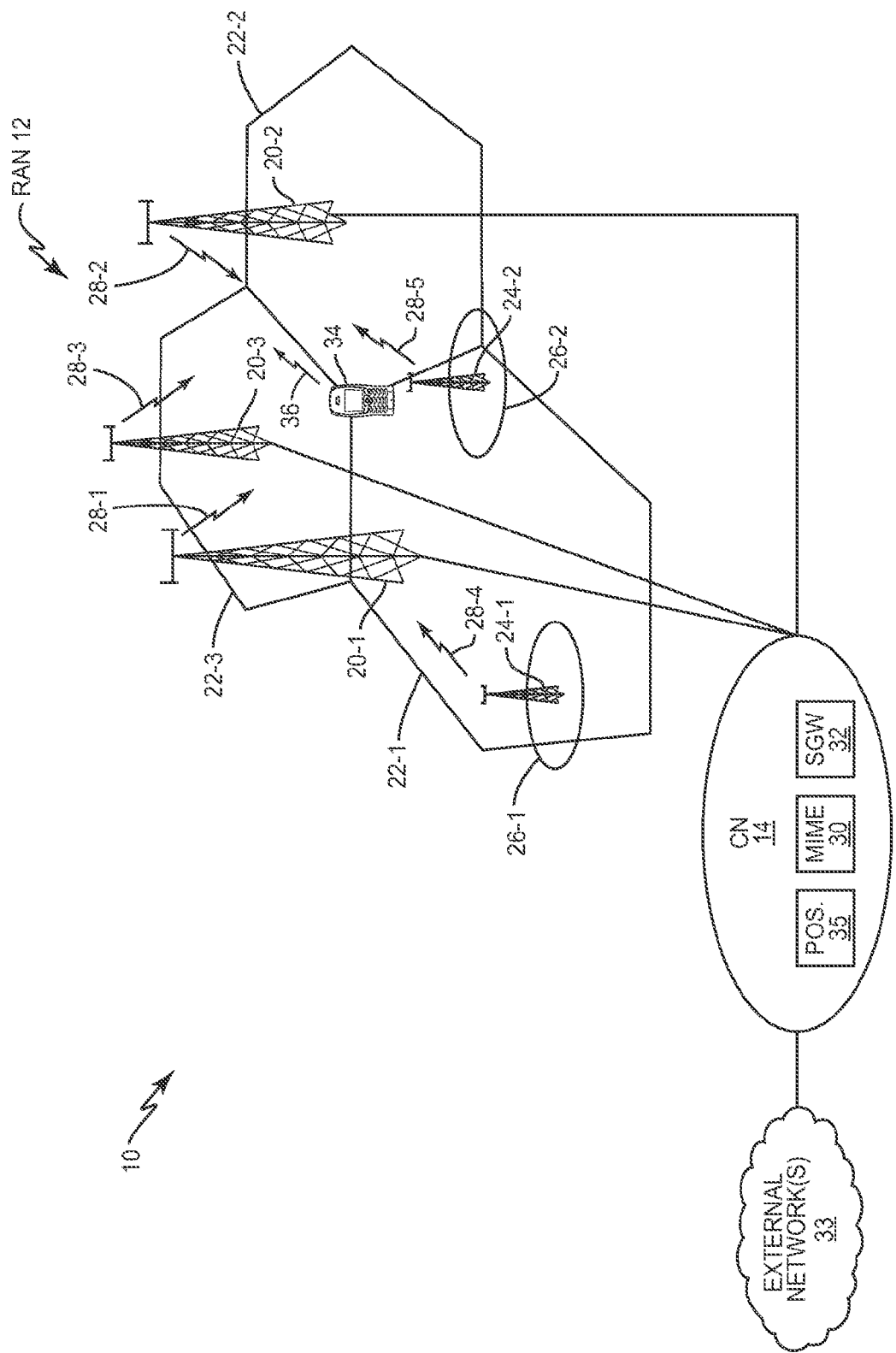
FIG. 1 is a partial block diagram of a communication network according to one embodiment, including one or more base stations or other network nodes and corresponding cells, along with one or more UEs or other wireless communication devices.

FIG. 1 illustrates an example communication network 10 that includes a Radio Access Network (RAN) 12 and a Core Network (CN) 14. In the simplified illustration, the RAN 12 includes a number of base stations 20, e.g., 20-1, 20-2, 20-3, 24-1, and 24-2. In a non-limiting heterogeneous network example, the base stations 20-1 through 20-3 are macro base stations providing radio service coverage in corresponding macro cells 22-1 through 22-3. Further, the base stations 24-1 and 24-2 are pico or femto base stations providing radio service coverage in corresponding, smaller cells 26-1 and 26-2. The smaller cells 26-1 and 26-2 may overlay one or more of the macro cells 22 and provide high data rate and/or other "hotspot" service, or may lie in coverage gaps at the macro cell borders. Of course, these examples are non-limiting and the base stations 20/cells 22 may represent one Radio Access Technology (RAT) and the base stations 24/cells 26 may represent another RAT, e.g., a mix of Long Term Evolution (LTE) base stations and cells and Wideband Code Division Multiple Access (WCDMA) base station and cells.

According to further illustrated details, the CN 14 includes a number of entities or network nodes, including, for example, one or more Mobility Management Entities (MMEs) 30 and one or more Serving Gateways (SGWs) 32. The CN 14 couples to one or more external networks 33 and cooperates with the RAN 12 to communicatively couple wireless communication devices 34, e.g., UEs, to such external networks 33 and/or to each other. The CN 14 further includes or is associated with one or more positioning nodes 35, e.g., an E-SLMC in an LTE embodiment of the network 10.

As part of this communicative coupling, the base stations 20 and 24 transmit signals to the wireless communication devices 34 using downlink carriers 28. For example, the base station 20-1 transmits on a downlink carrier 28-1, the base station 20-2 transmits on a downlink carrier 28-2, and so on. One or more of the downlink carriers 28 may be Orthogonal Frequency Division Multiplexed (OFDM) carriers, comprising a plurality of Resource Blocks (RBs) defined by the time-frequency grid of the OFDM carriers. As noted, not all of these OFDM downlink carriers necessarily have the same overall carrier bandwidth, nor do they all necessarily have the same center frequencies. Moreover, one or more of the downlink carriers 28 may operate with a different RAT than other ones of the downlink carriers 28.

In cases where all of the cells 22 and/or 26 providing radio service in or around the same geographic area(s) have the same configuration—i.e., the same overall carrier bandwidth and the same center frequency—the interference across the full bandwidth of any given such downlink carrier 28 more or less may be uniform. However, in cases where two or more such cells 22 and/or 26 in the network 10 have overlapping downlink carrier frequencies but have different bandwidths and/or different center frequencies, there may be uneven interference across the full carrier bandwidth of one or more such downlink carriers 28.

Figure 2:
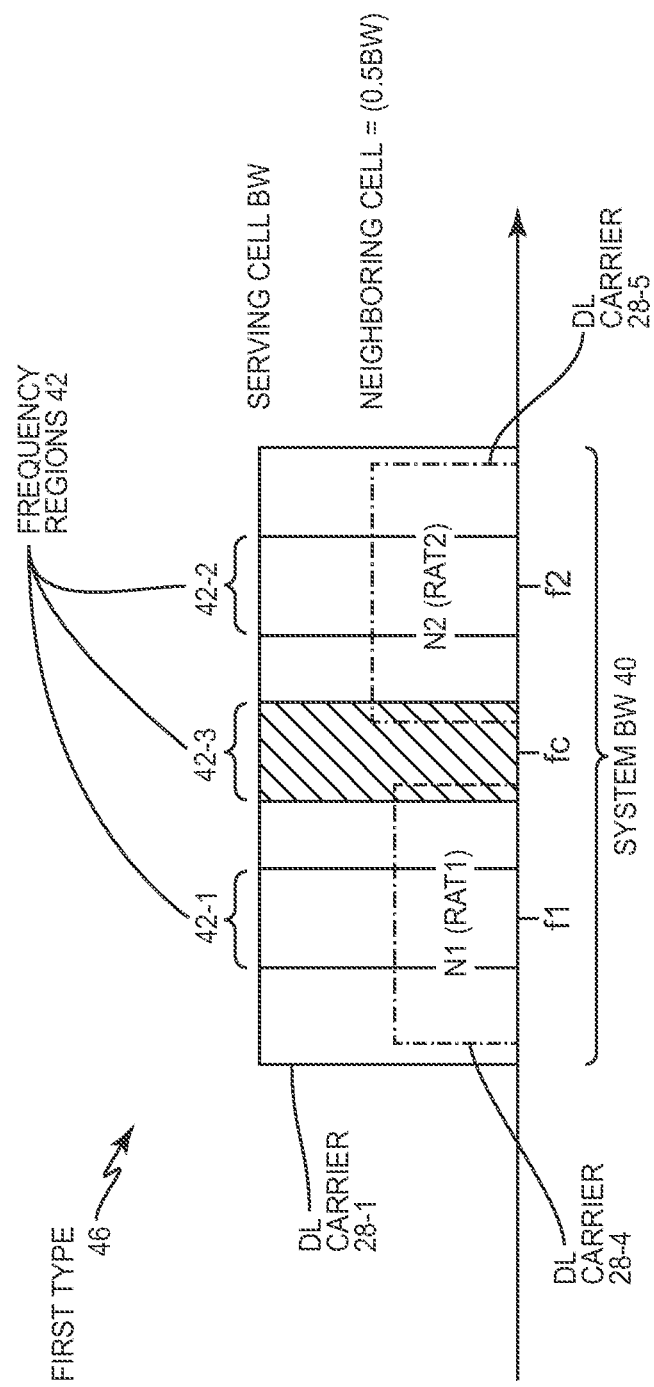
FIG. 2 is a diagram of multiple measurements being made in respective, multiple frequency regions of a downlink carrier that has "uneven" interference across its bandwidth arising from downlink carriers in adjacent cells having overlapping bandwidths but with different overall bandwidths and/or different center frequencies.

As an example, FIG. 2 illustrates an example embodiment contemplated herein, in accordance with the present invention. Assume that a first downlink carrier 28-1 has a 10 MHz LTE bandwidth, shown as a "system" bandwidth or BW 40. Further, assume that the downlink carrier 28-1 is interfered with by two 5 MHz neighbor cells 22 or 26—i.e., the downlink carrier 28-1 is associated with a first cell 22 or 26 in the network 10 which has two neighboring cells 22 or 26 in the network that transmit 5 MHz downlink carriers 28-4 and 28-5, as shown in the example diagram.

Therefore, the downlink carriers 28-4 and 28-5 have 0.5 or one-half the system BW 40 of the downlink carrier 28-1. Further, while their carrier frequencies overlap those used by the downlink carrier 28-1, the downlink carrier 28-4 is centered at frequency "f1," which lies to the left of the center frequency "fc" of the downlink carrier 28-1. Similarly, the downlink carrier 28-overlaps a portion of the downlink carrier 28-1 but is centered at "f2," which lies to the right of the fc center frequency of the downlink carrier 28-1. Thus, one might reasonably expect that the interference "picture" for the downlink carrier 28-1 as determined at the center frequency fc may be overly optimistic. That is, the downlink carriers 28-4 and 28-5 do not overlay the center frequency region of the downlink carrier 28-1 and, as a general proposition, do not cause interference in that central region. However, they do overlap frequency regions lying in the lower and upper portions of the overall carrier bandwidth (system BW 40) of the downlink carrier 28-1, and the interference in those regions would generally be higher than at the central region.

Thus, in one or more embodiments of the present invention, a wireless communication device 34 (shortened to "device 34") is configured to improve its signal quality determination for the first downlink carrier 28-1 based on being configured to obtain multiple signal quality measurements from at least first and second frequency regions 42-1 and 42-2 of the downlink carrier 28-1, as shown in FIG. 2. The device 34 uses the signal quality measurements from the different frequency regions 42-1 and 42-2 to determine the signal quality of the downlink carrier 28-1, e.g., based on some form of combining or averaging. In this manner, the device 34 makes an improved (more accurate) determination of signal quality for the downlink carrier 28-1 than would be achieved using the known, conventional approach shown in FIGS. 3 and 4.

Indeed, momentarily referring to FIG. 3, one sees that the conventional approach involves measuring signal quality for the downlink carrier 28-1 using measurements obtained from a single frequency region taken at the center frequency of the system BW 40. Now, in FIG. 3 where there is no asymmetrical or otherwise uneven interference across the system bandwidth 40, the conventional approach works well. FIG. 4, however, illustrates a problem recognized herein for the conventional approach, where there is uneven interference across the system BW 40 of the downlink carrier 28-1, and where measurements taken around the center frequency do not accurately reflect the interference seen elsewhere in the system BW 40.

Turning back to FIG. 2, then, one sees that the device 34 may be regarded as using a new, first type 46 of signal quality determination for the downlink carrier 28-1, wherein the device 34 obtains multiple signal quality measurements from the first and second frequency regions 42-1 and 42-2, and determines the signal quality for the downlink carrier 28-1 as a function of the signal quality measurements obtained from the first and second frequency regions 42-1 and 42-2.

Further, in a least one embodiment, the device 34 may obtain measurements from one or more additional frequency regions 42 of the downlink carrier 28-1, e.g., from a third frequency region 42-3. Regardless of the number of frequency regions 42 used, the device 34 advantageously determines the signal quality (e.g., the final or overall signal quality) as a function of the multiple signal quality measurements taken from the different regions 42. In one such example, the downlink carrier 28-1 is an OFDM carrier and the device 34 makes signal quality measurements using six RBs at the center frequency, e.g., region 42-3, and makes signal quality measurements on an additional six RBs comprising the frequency region 42-1 lying in the lower half of the system BW 40, and further makes signal quality measurements on an additional six RBs comprising the frequency region 42-2 lying in the upper half of the system BW 40. Thus, the improved signal quality determination comprises, in at least one embodiment herein, performing more than two signal quality measurements, e.g. three measurements in lower, middle and upper parts of the bandwidth, and using all such measurements to determine the overall or final signal quality that is acted on and/or reported by the device 34.

Figure 5:
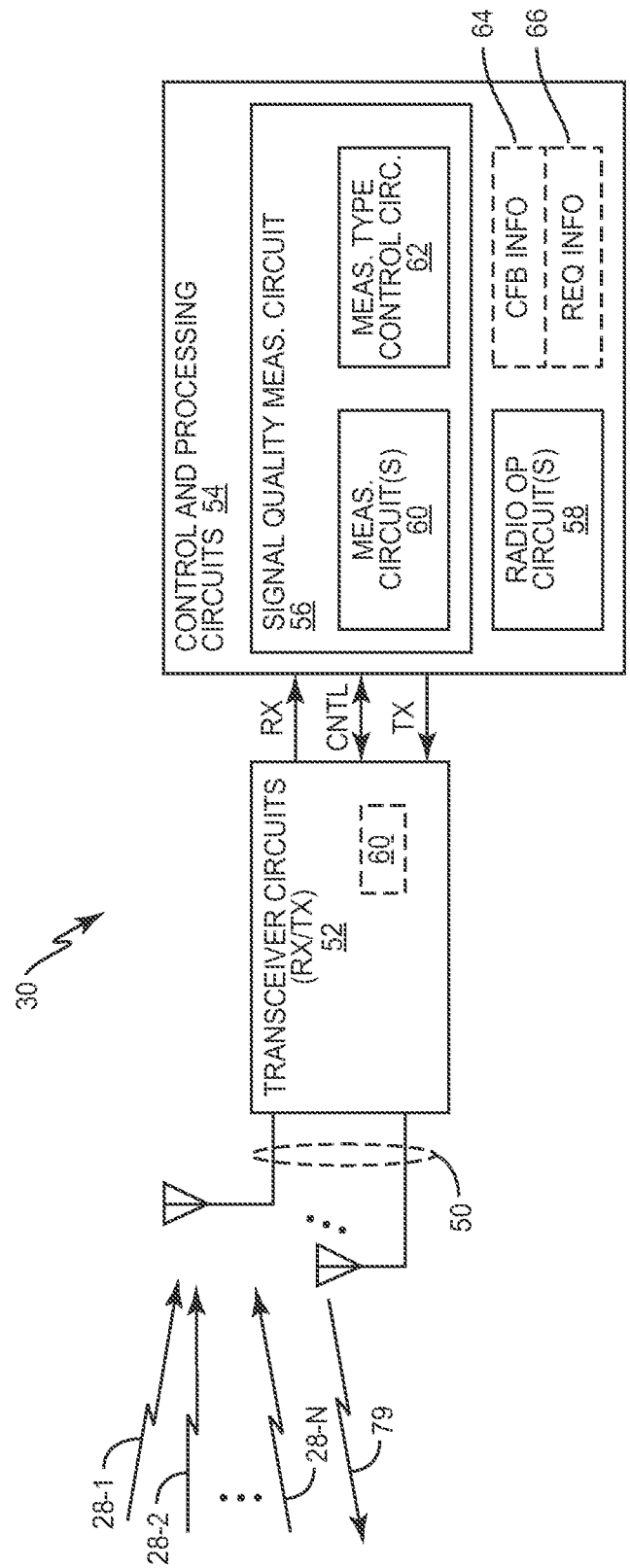
FIG. 5 is a block diagram of one embodiment of a wireless communication device.

FIG. 5 illustrates an example embodiment of the device 34, as configured for the above operations, or variations thereof. The illustrated embodiment includes a transceiver 52 that is configured to receive a downlink carrier 28 of a cell 22, 26 in the communication network 10, and one or more processing circuits 54 that are operatively associated with the transceiver 52 and configured to: determine a signal quality of a downlink carrier 28 of a cell 22, 26 in the communication network 10 according to a first type 46 of signal quality determination. As explained above for the first type 46 of signal quality determination, the one or more processing circuits 54 are configured to obtain multiple signal quality measurements from first and second frequency regions 42-1, 42-2 of a downlink carrier 28, and to determine the signal quality of the downlink carrier 28 as a function of the multiple signal quality measurements. Further, the one or more processing circuits 54 are configured perform at least one radio operation task using the determined signal quality.

In one or more embodiments, the at least one radio operation task comprises at least one of the following: a mobility or cell change in idle or connected states of the device 34; a primary carrier or primary cell, "PCell", change in carrier aggregation operation; positioning of the device 34; and reporting of the determined signal quality to the communication network 10.

In at least one embodiment, the first and second frequency regions 42-1, 42-2 are disjoint, i.e., separate and non-overlapping. In the same or another embodiment, the one or more processing circuits 54 are configured to obtain the signal quality measurements from the first frequency region 42-1 at a different time than used to obtain the signal quality measurements from the second frequency region 42-2, such that the signal quality measurements for the first and second frequency regions 42-1, 42-2 are taken at disjoint frequency regions and at disjoint times. Advantageously, such configurations allow the device 34 to reuse the same signal processing resources (e.g., circuitry and/or signal processing routines) to obtain the signal quality measurements at each of the multiple frequency regions 42 from which signal quality measurements are obtained.

As noted, in at least one embodiment, the first frequency region 42-1 is in a lower half of an overall carrier bandwidth of the downlink carrier 28, and the second frequency region 42-2 is in an upper half of the overall carrier bandwidth. For example, a first interfering downlink carrier 28 may be centered in the lower half of the system BW 40 of the downlink carrier 28 for which signal quality is being determined, and first measurements are obtained at the center frequency of that first interfering downlink carrier 28. Likewise, second measurements are obtained at the center frequency of a second interfering downlink carrier 28 that is centered in the upper half of the system BW 40 of the downlink carrier 28 for which signal quality is being determined And, of course, as noted for one or more embodiments, the one or more processing circuits 54 are configured in at least one embodiment to obtain signal quality measurements from first and second frequency regions 42-1 and 42-2 and one or more additional frequency regions 42 of the downlink carrier 28, for use in determining of the signal quality of the downlink carrier 28.

Still further, in the same other embodiments, the one or more processing circuits 54 are further configured to determine the signal quality of the downlink carrier 28 according to the first type 46 of signal quality determination on a selective step, based on being configured to decide whether to determine the signal quality of the downlink carrier 28 using the first type 46 of signal quality determination or using a different, second type 48 of signal quality determination. See, for example, FIG. 2, showing signal quality determination based on measurements taken from multiple frequency regions 42—i.e., the first type 46 of signal quality determination—and showing signal quality determination based on measurements taken from a single frequency region 42—i.e., an example of the second type 48 of signal quality determination.

In one example of selective use of the first type 46 of signal quality determination, the one or more processing circuits 54 are configured to decide to use the first type 46 of signal quality determination instead of the second type 48 of signal quality determination in response to a control indicator received from the communication network 10.

In the same or other embodiments, the one or more processing circuits 54 are configured to decide to use the first type 46 of signal quality determination instead of the second type 48 of signal quality determination in one or more of the following cases: network configuration information received or determined by the wireless communication device indicates that two or more cells 22, 26 in the network 10 that are of interest with respect to signal quality determination have overlapping downlink carrier frequencies but have different bandwidths and/or different center frequencies; and measurement requirements information received or determined by the wireless communication device 34 indicates that the first type 46 of signal quality determination is preferred.

It will be understood that an example of cells 22, 26 that are of interest with respect to signal quality determination comprises any mix of neighboring and serving cells 22, 26 with respect to the wireless communication device 34. Also, in at least one embodiment, the one or more processing circuits 54 are configured to send an indicator to the communication network indicating use of the first type 46 of signal quality determination by the wireless communication device 34.

Regardless of such implementation details, the signal quality measurements and determination at issue may be any one or more of the following: a Reference Signal Received Quality, "RSRQ", a Reference Signal Received Power, "RSRP", and a Received Signal Strength Indicator, "RSSI".

With these operational examples in mind, FIG. 5 illustrates an example embodiment of the device 34. In the non-limiting example, the device 34 includes one or more transmit/receive antennas 50, transceiver circuits 52, and control and processing circuits, which are numbered as and represent the aforementioned "one or more processing circuits 54". Here, the one or more processing circuits 54 comprise, at least functionally, radio operation circuits 58, measurement circuits 60, and measurement type control circuits 62.

Those skilled in the art will recognize the flexibility available with respect to literal circuit implementation, and the possibility of implementing the one or more processing circuits 54 using fixed or programmable circuits, or some mix thereof. For example, the one or more processing circuits 54 are at least partially implemented in baseband processing circuitry comprising one or more microprocessors, microcontrollers, Digital Signal Processors, or other digital processing circuitry that is at least partially configured based on the execution of computer program instructions stored in memory or another computer-readable medium, or accessible by the one or more processing circuits 54.

It should also be noted that the measurement circuits 60 may be at least partly implemented in the transceiver circuits 52, e.g., for analog signal measurement. Thus, the diagram illustrates the possibility of the measurement circuits 60 being included in the one or more processing circuits 54, the transceiver circuits 52, or distributed among them. While these illustrations are accurate as example embodiments, they are not limiting with respect to how the present invention is or can be implemented within the receiver circuitry at hand.

One also sees that the one or more processing circuits 54 may store, at least temporarily, certain operational data. For example, FIG. 5 shows the storage of network configuration information 64, which can be understood as the previously mentioned network configuration information used in deciding on a selective basis as to whether to use of the first type 46 of signal quality determination. Similarly, FIG. 5 illustrates the additional or alternative storage of measurement requirements information 66, which can be understood as an example of the previously mentioned measurement requirements information used in deciding on a selective basis as to whether to use of the first type 46 of signal quality determination.

One also sees in FIG. 5 that the device 34 may transmit a return indicator 79 to the network 10, to indicate use of the first type 46 of signal quality determination. Of course, receipt and recognition of the return indicator 79 depends on appropriate configuration of the base stations 22, 26 and/or one or more other network nodes.

Figure 6:
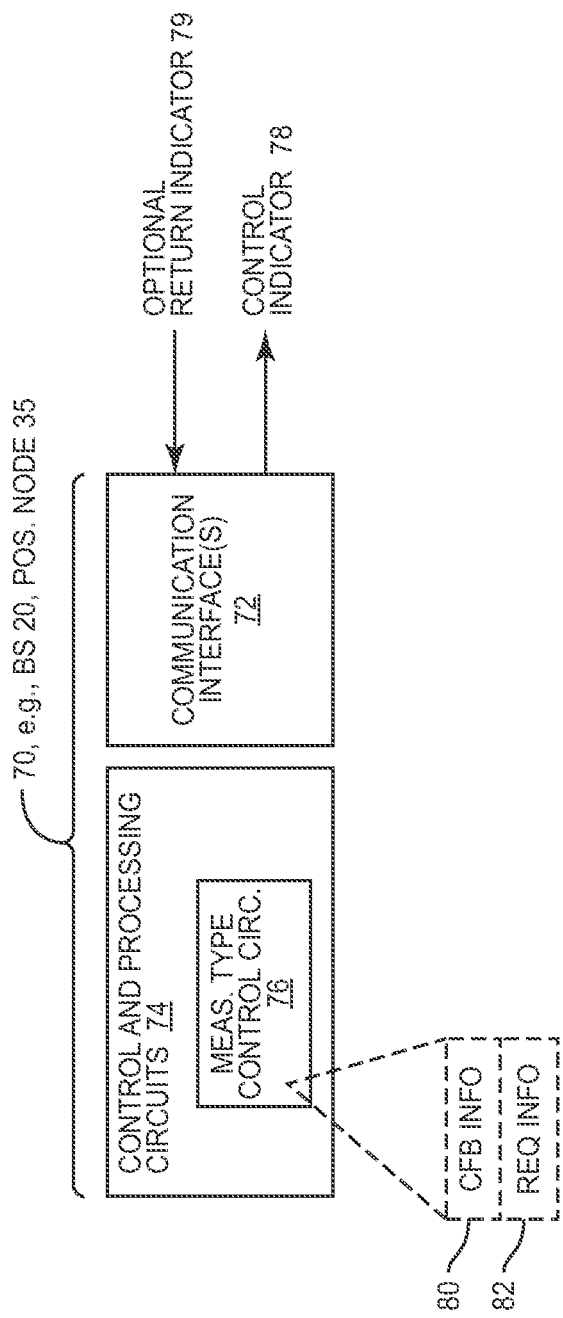
FIG. 6 is a block diagram of one embodiment of a network node, such as a base station, configured for use in a communication network.

FIG. 6 therefore illustrates a non-limiting example configuration for a network node 70, which may be a base station 20 or 26 in the network 10, for example. In another example, the network node 70 is a positioning node 35, e.g., an E-SLMC in an LTE embodiment. In yet another example, and in dependence on the radio network technology at issue, the network node 70 may be a Base Station Controller (BSC). The example network node 70 comprises one or more communication interfaces 72 for sending an indicator 78 to a device 34, to control whether the device 34 determines a signal quality for a downlink carrier 28 of a cell 22, 26 in the network 10 using a first type 46 of signal quality determination, or a second type 48 of signal quality determination. The node 70 further includes control and processing circuits 74, including a control circuit 76 that is configured to control the indicator 78, to indicate that the first type 46 of signal quality determination is to be used when two or more cells 22, 26 in the network 10 that are of interest with respect to signal quality determination by the device 34 have overlapping downlink carrier frequencies but have different bandwidths and/or different center frequencies and/or when more accurate signal quality determinations are required, as is indicated by measurement requirements information.

As such, the network node 70 may store or otherwise have access to network configuration information 80 and/or measurement requirements information 82. Such information may be copies of or may otherwise relate to the network configuration information 64 and measurement requirements information 66 stored by the device 34. Further, in at least one embodiment, the control indicator 78 comprises statically setting a value of the control indicator 78 in overhead broadcasts and/or during call setup, based on known network configuration data, such as included in provisioning information loaded into or otherwise accessible to the network node 70. Still further, because some devices 34 may not be configured to use the first type 46 of signal quality determination even where the control indicator 78 indicates that such a configuration should be activated at the device 34, the network node 70 in one or more embodiments is configured to receive and recognize a return indicator 79 from a device 34, indicating use of the first type 46 of signal quality determination by the device 34.

Figure 7:
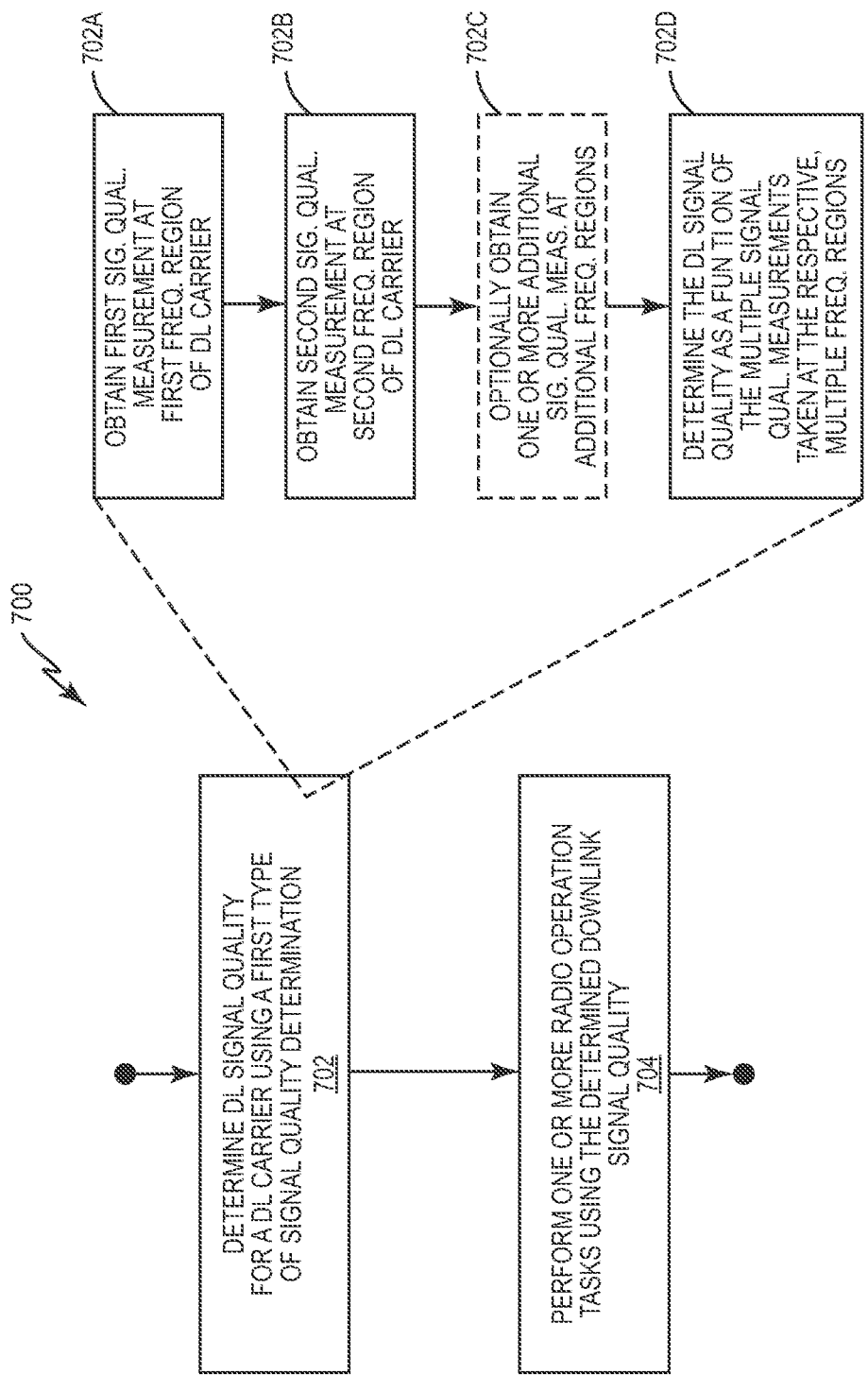
FIG. 7 is a logic flow diagram of one embodiment of a method of operation in a wireless communication device, including performing the first type of signal quality determination, such as shown in the example of FIG. 3.

FIG. 7 illustrates an embodiment of a method 700 for implementing the first type 46 of signal quality determination at an example device 34. The method 700 includes determining the signal quality of a downlink carrier 28 using the first type 46 of signal quality determination. More particularly, the flow diagram illustrates that such a determination comprises: obtaining first signal quality measurements at a first frequency region 42-1 of the downlink carrier 28 (Block 702A); obtaining second signal quality measurements at a second frequency region 42-2 of the downlink carrier 28 (Block 702B); optionally obtaining additional signal quality measurements from one or more additional frequency regions 42 of the downlink carrier 28 (Block 702C); and determining the signal quality of the downlink carrier 28 as a function of the multiple signal quality measurements taken at the respective multiple frequency regions 42 of the downlink carrier 28 (Block 702D).

Figure 8:
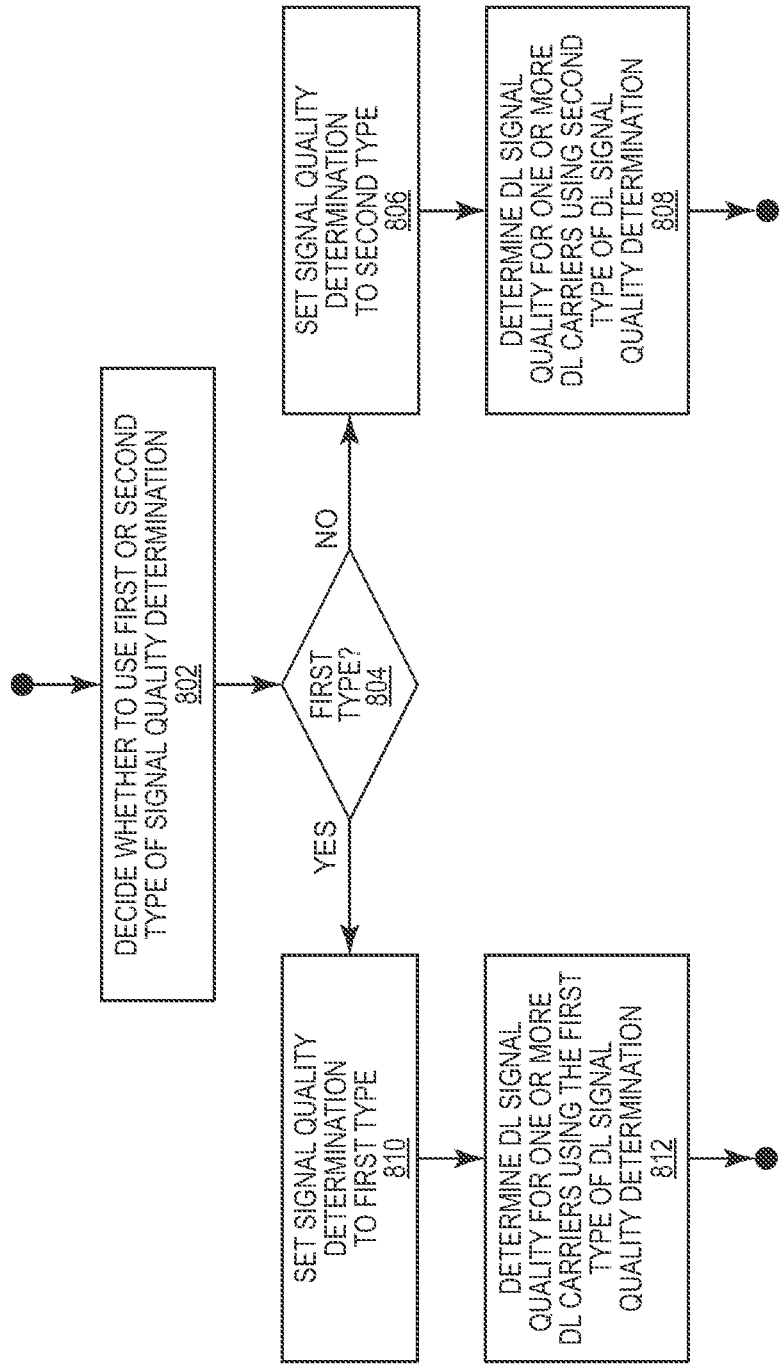
FIG. 8 is a logic flow diagram of one embodiment of an extension or variation of the processing shown in the method of FIG. 7.

FIG. 8 illustrates an example extension or variation of the method 700, and in particular provides an example of the selective use of the first or second types 46, 48 of signal quality determination by a device 34 that is configured to choose between them, whether once, e.g., at call setup, or dynamically, as conditions change, e.g., during mobility, etc. The illustrated method 800 includes deciding whether to use the first type 46 of signal quality determination or to use the second type 48 of signal quality determination (Block 802). The decision may be made autonomously, or may be commanded or otherwise directed by the network 10, as noted in the previous discussion.

If the device 34 decides to use the first type 46 of signal quality determination (YES from Block 804), then processing continues with setting the signal quality determination to the first type 46—e.g., by setting a logical flag and/or by invoking the appropriate signal quality determination routine or appropriately configuring the measurement circuitry. From there, processing continues with determining the signal quality of one or more downlink carriers 28 using the first type 46 of signal quality determination.

Of course, if the "NO" path is taken from Block 804, then the first type 46 of signal quality determination is not used and instead the device 34 configures itself for use of the second type 48 of signal quality determination, and it performs such determinations for one or more downlink carriers 28 of interest using the second type 48 of signal quality determination.

Figure 9:
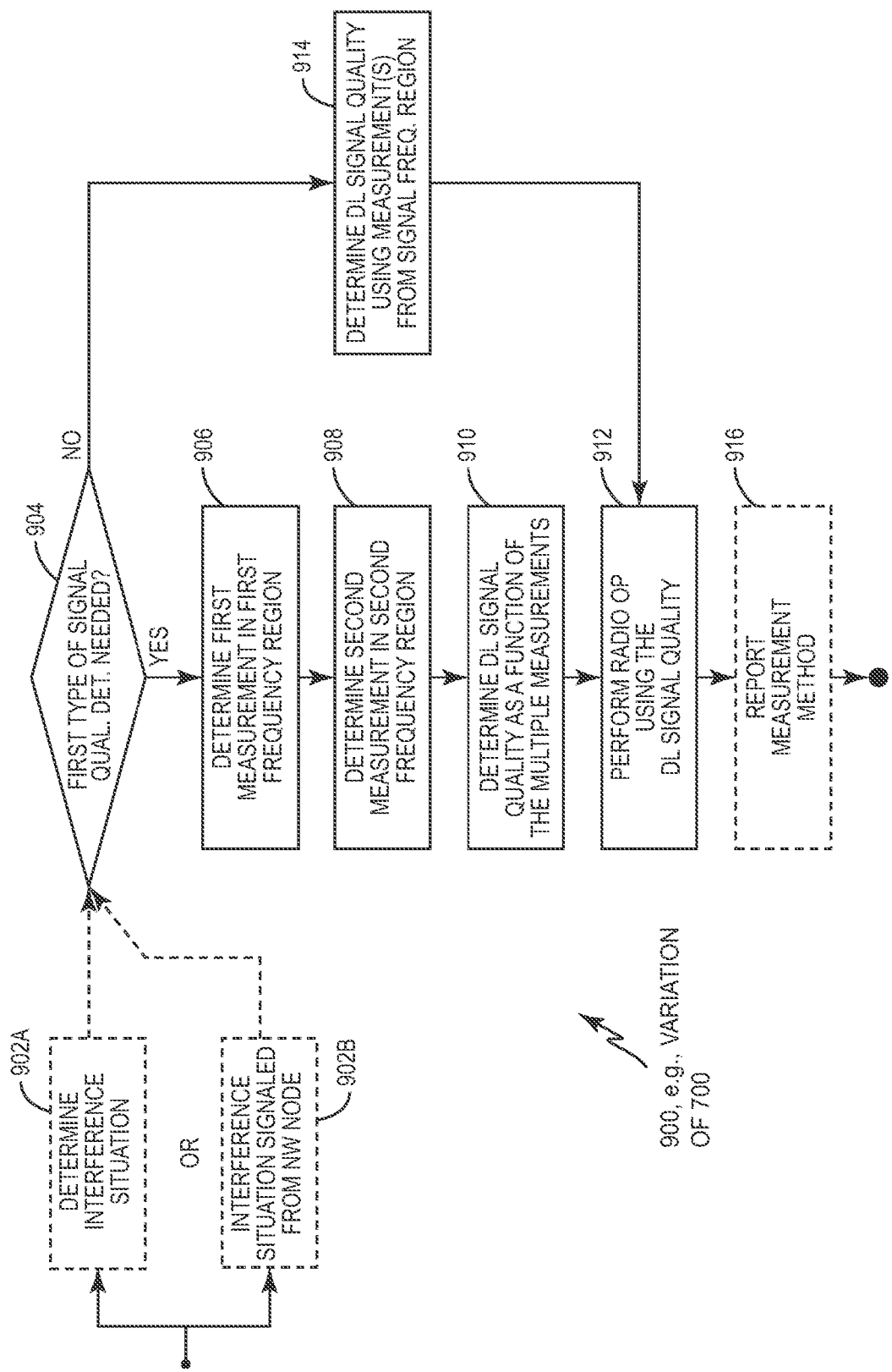
FIG. 9 is a logic flow diagram of another embodiment of an extension or variation of the processing shown in the method of FIG. 7.

Turning to FIG. 9, one sees yet another embodiment of processing at an example device 34 and the method 900 of FIG. 9 may be understood as yet another variation of the method 700. Here, processing includes determining the interference situation bearing on the determination of signal quality for one or more downlink carriers 28 of interest (Block 902A) or having such information signaled by the network 10 (Block 902B). In this context, the "interference situation" is as described before, i.e., the network configuration is such that, as a general proposition, there will or will not be an even distribution of interference across the system BW 40 of the one or more downlink carriers 28 for which signal quality is to be determined by the device 34. The "will not" case recommends the use of the first type 46 of signal quality determination, while the "will" case recommends the use of the second type 48 of signal quality determination, or at least makes the second type 48 more likely to be of sufficient accuracy.

Thus, the method 900 includes determining whether the first type 46 of signal quality determination is "needed" and, if so, processing continues with determining first measurements in a first frequency region 42-1 (Block 906), determining second measurements in a second frequency region 42-2 (Block 908), determining a signal quality of the downlink carrier 28 being measured using the first and second measurements (Block 910), and performing a radio operation task using the determined signal quality (Block 912)—i.e., performing one or more radio operation tasks, such as quality reporting back to the network, performing mobility operations, performing positioning/location operations, etc., using the determined signal quality.

The method 900 also includes the optional step (Block 916) of reporting the measurement type used—e.g., transmitting the aforementioned return indicator 79. Of course, if the decision is "NO" from Block 904, the method 900 uses the second type 48 of signal quality determination (Block 914), rather than the first type 46 of signal quality determination.

FIG. 10 illustrates a complementary method 1000 on the network side—e.g., at the previously described network node 70. The method 1000 includes the node 70 determining whether a device 34 should use the first type 46 or the second type 48 of signal quality determination (Block 1002). It will be understood that this decision may be made for individual devices 34, or may be made for groups of devices 34, including "group" of all devices 34 in a given region of the network 10, or in the network 10 in general.

The method 1000 further includes sending (1004) a control indicator 78 to the device 34 (or to all involved devices 34), to indicate whether the first type 46 of signal quality determination should be used. Still further, and at any given time during operations, the method 1000 optionally includes the network node 70 receiving and recognizing a return indicator 79 from one or more devices 34, indicating use by such one or more devices 34 of the first type 46 of the signal quality determination.

Note that when a given device 34 uses the first type 46 of signal quality determination, the respective frequency regions 42 may be of the same size as the measurement bandwidth used when the device 34 makes measurements for the second type 48 of signal quality determination. Furthermore, when obtaining measurements from the first and second frequency regions 42-1 and 42-2 (and, in general, any number of multiple frequency regions 42) for the first type 46 of signal quality determination, the device 34 may obtain such measurements in parallel, at the same time, or may obtain such measurements using time division multiplexing (TDM), where they are obtained at different times (but generally within the same measurement interval). Note that in one or more embodiments, the device 34 reports the measurement times involved, or at least indicates that it used the first type 46 of signal quality determination.

Also as noted, and merely by way of non-limiting examples, the measurements may be one or more of RSRQ, RSRP, RSSI, and/or SIR, SNR, SINR. The measurements may be requested and performed for any number of radio operation tasks, such as mobility (e.g., handover), positioning (by the device 34, the network 10, or in cooperation together), minimization of drive testing (MDT), self organizing network (SON) operation, automatic neighbor (cell) determinations (ANR), etc.

When the first type 46 of signal determination is used to determine the signal quality as a function of the measurements taken from the multiple frequency regions 42 of the involved downlink carrier 28, the function used to determine the final signal quality determination could be, but is not limited to, one of a max-, a min-, a mean-, or a median-function of over the first and second and any additional frequency regions 42. Also a filter, such as filtering over old first and second (and additional) signal measurements may be included in the function. The frequency regions 42 may be based on a defined number of resource blocks, or FFT bins. The frequency region size could be standardized for first and second types 46, 48 of signal quality determination, e.g., six RBs define each of the multiple frequency regions 42 used in the first type 46 of signal quality determination, and six RBs define the single frequency region 42 used in the second type 48 of signal quality determination.

As noted, the measurements obtained in different frequency regions 42 may be performed at the same time, or at different times, or using a mix of the same and different times. In one or more embodiments, the measurements are alternated between the different frequency regions. In yet another example, first and second measurements are obtained at the same time for respective first and second frequency regions 42, but additional measurements from one or more additional frequency regions 42 are obtained at a different time. If the device 34 is configured to signal use of the first type 46 of signal quality determination, such signaling may be sent, e.g., as part of a signal quality report message, or may be sent in a different message.

The network node 70 is, for example, a base station 20 or 24. In an LTE embodiment, such base stations are eNodeBs or eNBs. Alternatively, the network node 70 is a relay node or a donor base station serving a relay node, or is one of the following: a Radio Network Controller (RNC) in a High Speed Packet Access (HSPA) network; or a Base Station Controller (BSC) in a GSM, CDMA2000 or High Data Rate (HDR) network. Further, in one or more embodiments, the network node 70 comprises a positioning node, such as an E-SMLC in an LTE embodiment, for example. In at least one such embodiment, the positioning node sends an explicit indication that indicates to a device 34, or devices 34, as to whether the first type 46 or second type 48 of signal quality determination should be used. In one or more other such embodiments, the positioning node implicitly signals usage of the first type 46 or second type 48 of signal quality determination, e.g., by indicating the deployment scenarios, network/carrier configurations, etc., for which the first type 46 of signal quality determination should be used.

As for the explicit indication case, the network node 70 in one or more embodiments provides explicit signaling to devices 34, e.g., the control indicator 78 is transmitted to indicate to devices 34 whether they should use the first type 46 of signal quality determination. The devices 34 may be configured to use the first type 46 of signal quality determination for a first value or presence (or absence) of the control indicator 78, and to use the second type 48 of signal quality determination for a second value or absence (or presence) of the control indicator 78.

Further, the control indicator 78 may be sent in a standalone message, or may be included in another message, e.g., as an information element. In at least one embodiment, the control indicator 78 is provided to a device 34 from an eNB or RNC using Radio Resource Control (RRC) signaling, or by a positioning node using LTE Positioning Protocol (LLP) signaling.

Additionally, or alternatively, the network node 70 may control use of the first or second type 46, 48 of signal quality determination by one or more devices 34 by providing or otherwise indicating information about the deployment scenario for the network 10 and/or for particular areas of the network 10, e.g., it may indicate or provide the earlier discussed network configuration information 80. As noted in the background, such scenarios may include neighboring cells using downlink carriers 28 having the same center frequencies but having different system bandwidths 40, and/or using downlink carriers 28 in adjacent cells that have different center frequencies but have overlapping system bandwidths 40. (Here, "overlapping" means at least partly overlapping, but not necessarily completely overlapping.)

Such scenarios be pre-defined and in which case the network 10 only signals an indicator or an identifier of the scenario and the corresponding method which should be used by the device 34 for that scenario. The mapping between the scenario or group of scenarios and the corresponding measurement method can also be pre-defined. In this case the network 10 signals an indicator corresponding to the scenario and the corresponding measurement method. Or, the device 34 stores configuration data that maps different deployment scenarios to corresponding choices between use of the first or second type 46, 48 of signal quality determination. Here, the network 10 signals the deployment scenario that is relevant to the current location of the device 34 and the device 34 uses that indicated deployment scenario to choose between the first and second type 46, 48 of signal quality determination. Note that a non-LTE network node 70 deployed in or among LTE-based nodes may signal deployment or related control information to a device 34, for performing inter-RAT LTE measurement (e.g. inter-RAT RSRQ measurements).

Such information can be signaled to a device 34 that is in a low activity state (e.g. idle state, URA_PCH, CELL_PCH or CELL_FACH, etc.) or in a connected state. Here, "URA" denotes UTRAN Registration Area, "PCH" denotes Paging Channel, and "FACH" denotes Fast Access Channel. Note that the URA_PCH, CELL_PCH and CELL_FACH states are only applicable in UMTS.

Further, it is contemplated herein that in one or more embodiments, a pre-defined (e.g. standardized rule) dictates that if neighboring cells 22 and/or 26 operate with different bandwidths on a carrier frequency and/or if such cells with different bandwidths on a carrier have different center frequencies (e.g. 5 MHz UTRA or LTE cells on lower or upper part of 10 MHz cell bandwidth) then: devices 34 shall perform measurements according to specific measurement method, e.g., they shall determine signal quality using the first type 46 of signal quality determination. Additionally, or alternatively, such a rule may dictate that devices 34 shall meet measurement requirements over larger bandwidths (i.e. larger than 6 central RBs). The measurement requirements, such as may be identified or indicated by the measurement requirements information 66 and/or 82 may include an L1 measurement period, a measurement accuracy, the number of cells 22 and/or 26 to be measured over an L1 period, etc. Such requirements may have to be met when they are done for a specific purpose (e.g. for mobility or a specific type of mobility, such as in connected state) or for all or a group of purposes (e.g. mobility, positioning, etc.).

In such cases, a UE or other device 34 may receive explicit signaling from a node 70 in the network 10 about the scenario(s) in which the above pre-defined rule(s) shall apply. That is, whether cells 22 and/or 26 operate with different bandwidths on the same downlink carrier frequency and/or if cells 22 and/or 26 operate with different center frequencies on overlapping carrier bandwidths (e.g., 5 MHz UTRA or LTE cells on lower or upper part of a 10 MHz cell bandwidth). More broadly, a network node 70 may indicate when two or more cells 22 and/or 26 in the network 10 that are of interest with respect to signal quality determination have overlapping downlink carrier frequencies but have different bandwidths 40 and/or different center frequencies. Here, cells 22 and/or 26 that are of interest with respect to signal quality determination means, for example, cells that are adjacent or neighboring in some sense, such that they interfere with each other with respect to determining the signal quality on any one of them. Of course, it is also contemplated herein that a UE or other device 34 is configured to determine network scenarios autonomously. For example, measurement configuration information provided by the network 10 may include information about carrier frequencies for doing measurements, e.g. UTRA carriers (e.g. UARFCN or channel frequency numbers), E-UTRA carriers (e.g. EARFNC or channel frequency numbers), etc. (EARFCN denotes "Evolved absolute radio frequency channel number", while UARFCN denotes "UMTS absolute radio frequency channel number")

Because the UE or other device 34 knows its serving cell bandwidth 40, the signaled channel frequency numbers of different carriers enables the UE or other device 34 to determine the location of different carriers with respect to the serving cell in frequency domain. In at least one embodiment, the UE or other device 34 is configured to use the measurement configuration information for autonomously or implicitly determining the scenario(s) where the first type 46 of signal quality determination should be used, e.g., because it is more likely to yield better performance. The contemplated UE or other device 34 therefore can dynamically choose between the first and second types 46, 48 of signal quality determination, e.g., for making RSRQ measurements, and can switch types as it moves through different configuration areas/deployment scenarios of the network 10, or as it switches from one network 10 to another.

According to this embodiment, the UE or other device 34 may report to the network node 70 which measurement type it has used for a particular measurement (e.g., RSRQ), along with reporting the measurement results. In at least one such embodiment, the UE or other device 34 indicates whether it used the first or second type 46, 48 of signal quality determination for determining the quality value being reported. Such an indication may be included in the reporting message, or may be reported in a different message. In one or more embodiments, the relevant signaling protocols used in the network 10 are revised to provide for the indication, e.g., the earlier described return indicator 79.

In any case, the signaled information enables the network 10 to interpret the measurement results of measurements done by the UE or other device 34 in different scenarios. The UE or other device 34 may signal the information about the measurement method used either proactively or when requested by the network 10. The network may request such information specifically for certain purposes, such as for MDT, SON, ANR, and/or for network planning etc. The UE or other device 34 may provide the above mentioned information proactively to the network 10, especially when it determines a scenario where it is feasible, advantageous, or, more generally, where use of the first type 46 of signal quality determination will lead to more accurate measurement.

In the same or other embodiments, the UE or other device 34 uses the first type 46 of signal quality determination when it cannot meet measurement requirements using the simpler, second type 48 of signal quality determination. Correspondingly, the UE or other device 34 sends the return indicator 79 or other flag or message to the network 10, indicating use by the UE or other device 34 of the first type 46 of signal quality determination. The UE or other device 34 also may proactively provide information to the network 10 about the detected scenario (e.g., that it has detected cells 22 and/or 26 with different bandwidths 40 on the same carrier frequency) to the network 10, along with the measurement results. This type of information can be used by the network 10 for improving network planning, for selecting parameters related to measurements, etc.

As such, the present invention offers a number of advantages. Non-limiting example advantages include more reliable and robust signal measurements, e.g., improved RSRQ measurements, particularly in the context of the network deployment scenarios discussed in the background herein. As a further advantage, in one or more embodiments, a UE or other device 34 is configured to use the same measurement circuits, or substantially the same such circuits, for determining signal quality using the first and second types 46, 48 of signal quality determination.

For example, in an LTE context, for the second type 48 of signal quality determination, the UE or other device 34 is configured to determine the signal quality of the downlink carrier 28 being evaluated, based on measurements taken from a single frequency regions 42, e.g., measurements from some number of RBs (e.g., six) at the center frequency of the downlink carrier 28. Advantageously, for determining the signal quality using the first type 46 of signal quality determination, the UE or other device 34 takes measurements from at least first and second frequency regions 42-1 and 42-2, but each such region is the same size (in terms of RBs) as the single-frequency region, and therefore the same measurement circuitry and/or signal processing resources can be reused for each such region.

Thus, a device 34 advantageously performs signal measurements in at least first and second frequency regions 42 in such a way that the signal measurements are like those performed by the device 34 when it makes its signal quality determinations using only a single frequency region 42. For example, preferably the bandwidth covered by each one of the multiple frequency regions 42 is the same as that covered by the single frequency region 42, so that the same hardware and/or other processing resources can be reused between the first and second types 46, 48 of signal quality determination, or at least be easily adapted to provide for their use in both types 46, 48 of signal quality determination.

Regardless, better signal quality determinations improve mobility decisions, e.g., more reliable handover is provided. Further, better signal quality determination improves positioning operations.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only, and not for purposes of limitation.

What is claimed is:

1. A method of operation in a wireless communication device configured for operation in a communication network comprising:
   determining a signal quality of a downlink carrier of a cell in the communication network according to a first type of signal quality determination that includes obtaining multiple signal quality measurements from first and second frequency regions of the downlink carrier, and determining the signal quality of the downlink carrier as a function of the multiple signal quality measurements; and
   performing at least one radio operation task using the determined signal quality.

2. The method of claim 1, wherein the at least one radio operation task comprises at least one of the following: a mobility or cell change in idle or connected states of the wireless communication device; a primary carrier or primary cell (PCell) change in carrier aggregation operation; positioning of the wireless communication device; and reporting of the determined signal quality to the communication network.

3. The method of claim 1, wherein the first and second frequency regions are disjoint.

4. The method of claim 3, further comprising obtaining the signal quality measurements from the first frequency region at a different time from which the signal quality measurements are obtained from the second frequency region, such that the signal quality measurements for the first and second frequency regions are taken from disjoint frequency regions and at disjoint times.

5. The method of claim 1, wherein the first frequency region is in a lower half of an overall carrier bandwidth of the downlink carrier, and wherein the second frequency region is in an upper half of the overall carrier bandwidth.

6. The method of claim 1, further comprising obtaining signal quality measurements from one or more additional frequency regions of the downlink carrier, for use in said determining of the signal quality of the downlink carrier.

7. The method of claim 1, wherein the first type of signal quality determination is used responsive to receiving a first control indicator from the communication network that indicates use of the first type of signal quality determination, and wherein the method comprises, for a different downlink carrier or for a different signal quality determination, determining that a second control indicator indicates use of a second type of signal quality determination different than the first type of signal quality determination and, for said different downlink carrier or for said different signal quality determination, deciding to use the second type of signal quality determination rather than the first type of signal quality determination.

8. The method of claim 7, wherein the first type of signal quality determination comprises measuring signal quality in the first and second frequency regions as positioned on respective sides of a center frequency of the downlink carrier and the second type of signal quality determination comprises measuring signal quality in a single frequency region on the center frequency of the downlink carrier.

9. The method of claim 1, further comprising, for a different downlink carrier or for a different signal quality determination, deciding to use the first type of signal quality determination instead of a second type of signal quality determination when one or more of the following conditions applies:
   network configuration information received or determined by the wireless communication device indicates that two or more cells in the network that are of interest with respect to signal quality determination have overlapping downlink carrier frequencies but have different bandwidths and/or different center frequencies; and
   measurement requirements information received or determined by the wireless communication device indicates that the first type of signal quality determination is preferred.

10. The method of claim 1, wherein the downlink carrier is an Orthogonal Frequency Division Multiplexed (OFDM) carrier and wherein the first and second frequency regions comprise different sets of resource blocks of the OFDM carrier.

11. The method of claim 1, wherein the method further includes determining the signal quality of two or more downlink carriers of two or more cells in the communication network.

12. The method of claim 1, wherein the method further includes sending an indicator to the communication network indicating use of the first type of signal quality determination by the wireless communication device.

13. The method of claim 1, wherein determining the signal quality comprises determining one or more of: a Reference Signal Received Quality (RSRQ), a Reference Signal Received Power (RSRP), and a Received Signal Strength Indicator (RSSI).

14. A wireless communication device configured for operation in a communication comprising:
   a transceiver configured to receive a downlink carrier of a cell in the communication network; and
   one or more processing circuits operatively associated with the transceiver and configured to:
   determine a signal quality of a downlink carrier of a cell in the communication network according to a first type of signal quality determination, wherein the one or more processing circuits are configured to obtain multiple signal quality measurements from first and second frequency regions of the downlink carrier, and determine the signal quality of the downlink carrier as a function of the multiple signal quality measurements; and
   perform at least one radio operation task using the determined signal quality.

15. The wireless communication device of claim 14, wherein at least one radio operation task comprises at least one of the following: a mobility or cell change in idle or connected states of the wireless communication device; a primary carrier or primary cell (PCell), change in carrier aggregation operation; positioning of the wireless communication device; and reporting of the determined signal quality to the communication network.

16. The wireless communication device of claim 14, wherein the first and second frequency regions are disjoint.

17. The wireless communication device of claim 16, wherein the one or more processing circuits are configured to obtain the signal quality measurements from the first frequency region at a different time than used to obtain the signal quality measurements from the second frequency region, such that the signal quality measurements for the first and second frequency regions are taken at disjoint frequency regions and at disjoint times.

18. The wireless communication device of claim 14, wherein the first frequency region is in a lower half of an overall carrier bandwidth of the downlink carrier, and wherein the second frequency region is in an upper half of the overall carrier bandwidth.

19. The wireless communication device of claim 14, wherein the one or more processing circuits are further configured to obtain signal quality measurements from one or more additional frequency regions of the downlink carrier, for use in said determining of the signal quality of the downlink carrier.

20. The wireless communication device of claim 14, wherein the one or more processing circuits are configured to use the first type of signal quality determination responsive to receiving a control indicator from the communication network that indicates use of the first type of signal quality determination, and, for a different downlink carrier or for a different signal quality determination, determine that a second control indicator indicates use of a second type of signal quality determination different than the first type of signal quality determination and, for said different downlink carrier or for said different signal quality determination, decide to use the second type of signal quality determination rather than the first type of signal quality determination.

21. The wireless communication device of claim 20, wherein the one or more processing circuits are configured to perform the first type of signal quality determination by measuring signal quality in the first and second frequency regions as positioned on respective sides of a center frequency of the downlink carrier and the second type of signal quality determination comprises measuring signal quality in a single frequency region at the center frequency of the downlink.

22. The wireless communication device of claim 14, wherein the one or more processing circuits are configured to, for a different downlink carrier or for a different signal quality determination, decide to use the first type of signal quality determination instead of the second type of signal quality determination in one or more of the following cases:
    network configuration information received or determined by the wireless communication device indicates that two or more cells in the network that are of interest with respect to signal quality determination have overlapping downlink carrier frequencies but have different bandwidths and/or different center frequencies; and
    measurement requirements information received or determined by the wireless communication device indicates that the first type of signal quality determination is preferred.

23. The wireless communication device of claim 14, wherein the downlink carrier is an Orthogonal Frequency Division Multiplexed (OFDM) carrier and wherein the first and second frequency regions comprise different sets of resource blocks of the OFDM carrier.

24. The wireless communication device of claim 14, wherein the one or more processing circuits are configured to determine the signal quality of two or more downlink carriers of two or more cells in the communication network, said two or more cells being any mix of neighboring and serving cells with respect to the wireless communication device.

25. The wireless communication device of claim 14, wherein the one or more processing circuits are configured to send an indicator to the communication network indicating use of the first type of signal quality determination by the wireless communication device.

26. The wireless communication device of claim 14, wherein the one or more processing circuits are configured to determine signal quality as one or more of: a Reference Signal Received Quality (RSRQ), a Reference Signal Received Power (RSRP), and a Received Signal Strength Indicator (RSSI).

27. A network node configured for operation in a communication network, said network node comprising:
    one or more communication interfaces for sending an indicator to a wireless communication device, to control whether a wireless communication device determines a signal quality for a downlink carrier of a cell in the communication network using a first type of signal quality determination, or a second type of signal quality determination; and
    a control circuit configured to control said indicator to indicate that the first type of signal quality determination is to be used when:
    two or more cells in the network that are of interest with respect to signal quality determination by the wireless communication device have overlapping downlink carrier frequencies but have different bandwidths and/or different center frequencies; or
    more accurate signal quality determinations are required, as is indicated by measurement requirements information.

28. The network node of claim 27, wherein the network node is configured to receive and recognize a return indicator from the wireless communication device, indicating use of the first type of signal quality determination by the wireless communication device.

29. A method of controlling the type of signal quality determination used by a wireless communication device, said method implemented in a network node of a communication network and comprising:
    sending an indicator to a wireless communication device, to control whether the wireless communication device determines a signal quality of a downlink carrier of a cell of the network using a first type or a second type of signal quality determination; and
    controlling said indicator to indicate that the first type of signal quality determination is to be used, when:
    two or more cells in the network that are of interest with respect to signal quality determination by the wireless communication device have overlapping downlink carrier frequencies but have different bandwidths and/or different center frequencies; or
    more accurate signal quality determinations are required, as is indicated by measurement requirements information.

30. The method of claim 29, further comprising receiving and recognizing a return indicator from the wireless communication device, indicating use of the first type of signal quality determination by the wireless communication device.

* * * * *

UNITED STATES PATENT AND TRADEMARK OFFICE
CERTIFICATE OF CORRECTION

PATENT NO. : 9,071,980 B2
APPLICATION NO. : 13/522807
DATED : June 30, 2015
INVENTOR(S) : Axmon et al.

Page 1 of 1

It is certified that error appears in the above-identified patent and that said Letters Patent is hereby corrected as shown below:

In the Specification

In Column 7, Line 15, delete "28-overlaps" and insert -- 28-5 overlaps --, therefor.

In Column 9, Line 4, delete "determined" and insert -- determined. --, therefor.

In Column 15, Line 26, delete "number")" and insert -- number".) --, therefor.

Signed and Sealed this
Thirtieth Day of August, 2016

Michelle K. Lee
*Director of the United States Patent and Trademark Office*